UNITED STATES PATENT OFFICE.

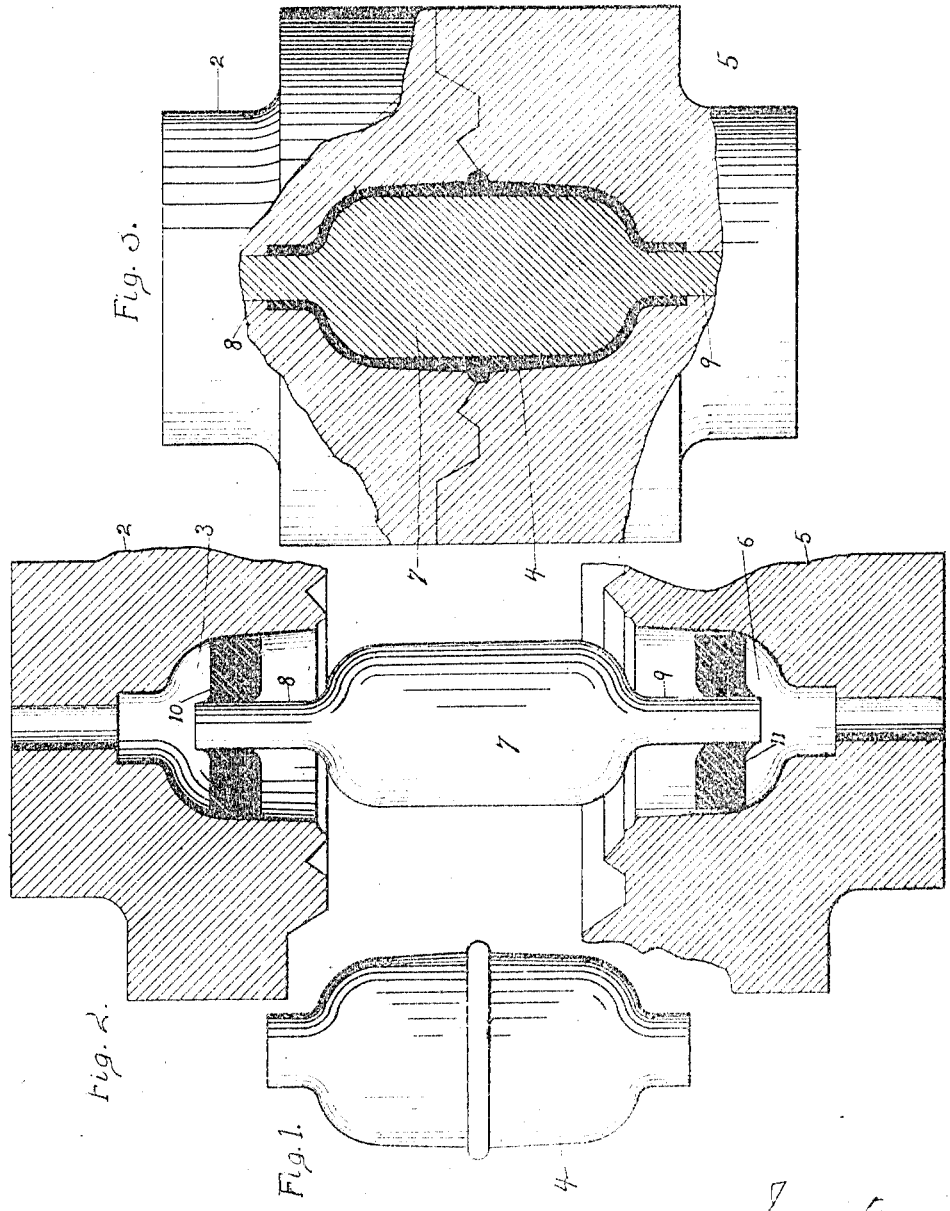

JAMES A. MURRAY, OF NEW HAVEN, CONNECTICUT, ASSIGNOR OF ONE-HALF TO JEREMIAH L. MAHONEY, OF NEW HAVEN, CONNECTICUT.

APPARATUS FOR PRODUCING RUBBER BULBS FOR ATOMIZERS, SYRINGES, &c.

1,040,737. Specification of Letters Patent. Patented Oct. 8, 1912.

Application filed January 18, 1911. Serial No. 603,298.

*To all whom it may concern:*

Be it known that I, JAMES A. MURRAY, a citizen of the United States, residing at New Haven, in the county of New Haven and State of Connecticut, have invented a new and useful Improvement in Apparatus for Producing Rubber Bulbs for Atomizers, Syringes, &c.; and I do hereby declare the following, when taken in connection with the accompanying drawings and the letters of reference marked thereon, to be a full, clear, and exact description of the same, and which said drawings constitute part of this specification, and represent, in—

Figure 1 a side view of a rubber bulb for atomizers, syringes, etc., constructed in accordance with my invention. Fig. 2 a sectional view showing the dies for producing the same and illustrating the dies in an open position preparatory to forming the bulb. Fig. 3 a sectional view of the dies in the closed position showing the completed bulb therein.

This invention relates to an improvement in apparatus for producing rubber bulbs for atomizers, syringes, etc. As usually constructed these bulbs are formed in two pieces which are united on a longitudinal line, but difficulty is experienced in uniting the edges of the parts so that they will not separate.

The object of this invention is to mold the bulb upon a core so that it is produced without a seam; and the invention consists in the method and apparatus hereinafter described and particularly recited in the claim.

In carrying out my invention I employ a male die 2 having a cavity 3 corresponding to one-half of a completed bulb 4, and a female die 5 having a cavity 6 corresponding to the other half of the bulb, assuming that the bulb is divided transversely. In connection with these dies I employ a core 7 corresponding to the internal dimensions of the bulb, and with a stem 8 at one end and a stem 9 at the other end corresponding in diameter to the internal diameter of the openings formed in the ends of the bulb. Over the stem 8 I place a disk 10 of rubber, and over the stem 9 a corresponding disk 11 of rubber, the disks 10 and 11 containing a sufficient amount of rubber to form a complete bulb. The dies are then brought together and the rubber is squeezed around the bulb and their edges firmly united as shown in Fig. 3 of the drawings, so that a bulb is formed of a single piece and the abutting edges are so united as to form an integral structure. While the rubber is still warm or "green" the bulb is stripped from the core and the rubber will yield sufficiently to allow the core to be withdrawn through one end of the bulb. The bulbs are then trimmed in the usual manner adapting them to be coupled with tubing. By this method of forming bulbs, a longitudinal seam is avoided, and as before stated the stock uniting at the center forms a perfect joint or weld and at the point where the stock is thickest.

I claim:—

The herein described apparatus for forming rubber bulbs consisting of a male die and a female die having recesses each corresponding to half of a bulb divided transversely, combined with a core corresponding to the internal dimensions of the bulb, said core formed at opposite ends with stems over which disks of rubber may be placed, the said ends of the cores co-acting one with the male, and the other with the female die and whereby when the dies are closed together, the rubber will be spread around the core and the edges united at the center.

In testimony whereof, I have signed this specification in the presence of two subscribing witnesses.

JAMES A. MURRAY.

Witnesses:
 FREDERIC C. EARLE,
 CLARA L. WEED.